Sept. 18, 1962 J. E. PARTINGTON 3,054,544

CARD HOLDER

Filed Sept. 10, 1958

*INVENTOR:*
JOHN E. PARTINGTON
*BY*
Marzall, Johnston, Cook & Root
ATT'YS 3,054,544
Patented Sept. 18, 1962

3,054,544
CARD HOLDER

John E. Partington, Indianapolis, Ind., assignor to Research Evaluation Associates, Inc., Libertyville, Ill., a corporation of Illinois Filed Sept. 10, 1958, Ser. No. 760,197
2 Claims. (Cl. 225—93)

This invention relates in general to a card holder, and more particularly to a card holder adapted to hold a card of the type used by computing and processing machines, wherein the card may be manually punched for use in computing and processing machines.

The modern trend in computing and processing data is to employ electronic computation and processing machines such as those made by I.B.M. and Remington Rand, which utilize punched cards for feeding data to the machines. Accordingly, before operation of the machines, it is necessary to initially punch the data processing cards. Heretofore, this has been accomplished by elaborate and expensive mechanism. Generally, information to be placed on a card is initially recorded by writing or typing same on a form which may be eventually forwarded to a card punching machine for preparation of a punched card for use in the computation or data processing machines. Thus, a series of steps must be followed before a punched card is ready for use in a computation or data processing machine.

The card holder of the present invention is extremely simple in structure and may be likewise very economically manufactured, and therefore may have widespread use by any data gathering agency without incurring any appreciable amount of extra cost in equipment. Yet the present invention will eliminate the usual series of steps in transmitting information to punched cards, whereby the information may be initially placed on the cards by a person processing data without using any expensive punching machine or requiring two operations thereby resulting in overall economy.

It is therefore an object of this invention to provide an improved card holder for use with the preparation of punched cards to be employed in data processing machines.

Another object of this invention resides in the provision of an extremely simply constructed and economically manufactured card holder for holding cards during manual punching of same.

Still another object of this invention is in the provision of a card holder adapted to hold cards during punching of same for use in data processing and computation machines, wherein the punched portions of the card are held by the holder during the punching operations.

A further object of this invention is to provide an improved card holder for removably receiving data processing cards for punching operations, wherein the holder may be used by any data gathering agency such as salesmen, an insurance office, a stock inventory control unit, or any other agency whose end card product would eventually be fed to a computation or processing machine whereby preparation of the data by some other method and subsequent preparation of punched cards is eliminated thereby resulting in overall operational economy.

A still further object of this invention is to provide a card holder adapted to hold a card having perforated portions that may be easily punched out during punching thereof for subsequent use in data processing or computing machines, whereby the present invention would permit the card to be punched immediately without going through an additional series of steps thereby reducing the overall cost of operation.

Another object of this invention is to provide a card holder including a frame of relatively rigid material, a sheet of absorbent or resilient material supported by the frame, means for removably holding a card having weakened portions that may be easily punched out over the resilient material, and a punching member.

Still another object of this invention resides in the provision of a card holder which includes means for storing additional cards.

Other objects, features, and advantages of the invention will be apparent from the following detailed disclosure, taken in conjunction with the accompanying sheet of drawings, wherein like reference numerals refer to like parts, in which.

Figure 1:
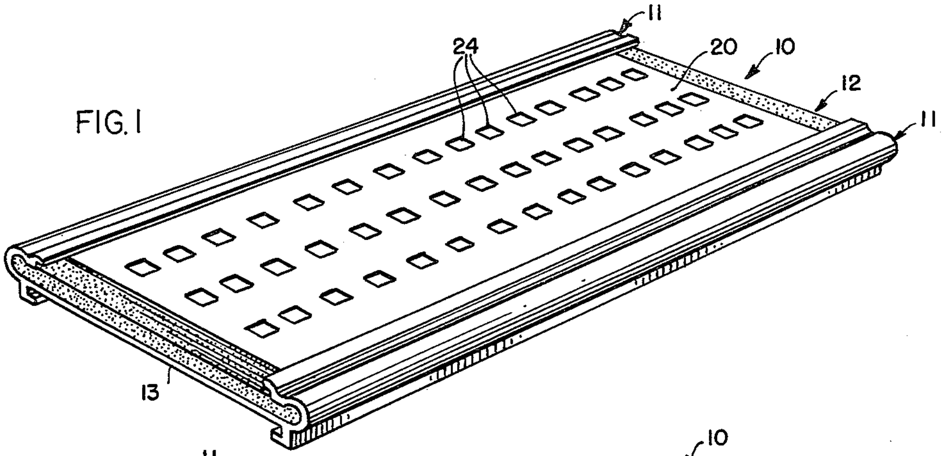
FIG. 1 is a perspective view of the card holder according to the present invention and illustrating a card in position and held by the holder.
Figures 2, 3:
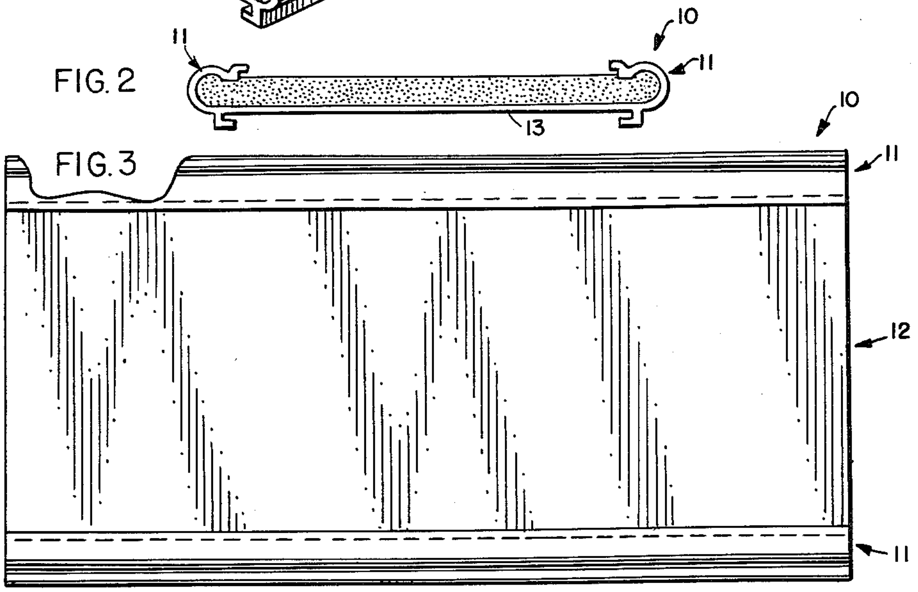
FIG. 2 is an end elevational view of the card holder of FIG. 1.
FIG. 3 is a bottom plan view of the card holder.

Referring now to the drawings, the card holder of the present invention, generally designated by the numeral 10, generally includes a frame 11 and a sheet of resilient material 12.

The frame 11 is constructed of a relatively rigid material, such as cardboard, plastic or extruded aluminum and includes an elongated backing plate 13 which supports the resilient material 12 thereon. The backing plate 13 is relatively rectangular in shape, although it may taken any other shape depending upon the type of card to be supported by the holder. Opposed edges of the backing plate 13 are reversely bent to define a loop or V-shaped portion 14 closing a pair of opposed edges of the plate and terminating in an enlarged elongated bead 15. Each reversely bent portion is identical, and therefore only one will be specifically described.

The bead 15 is provided at its underside with an elongated clamping edge 16 which reduces the distance from the top surface of the backing plate 13 to such an extent as to squeeze the corresponding edge portion of this resilient material 12 against the backing plate. Accordingly, opposed edges of the resilient material 12 are clamped to the backing plate 13 of the frame for securely mounting the sheet of resilient material 12 thereon.

Figures 4, 5:
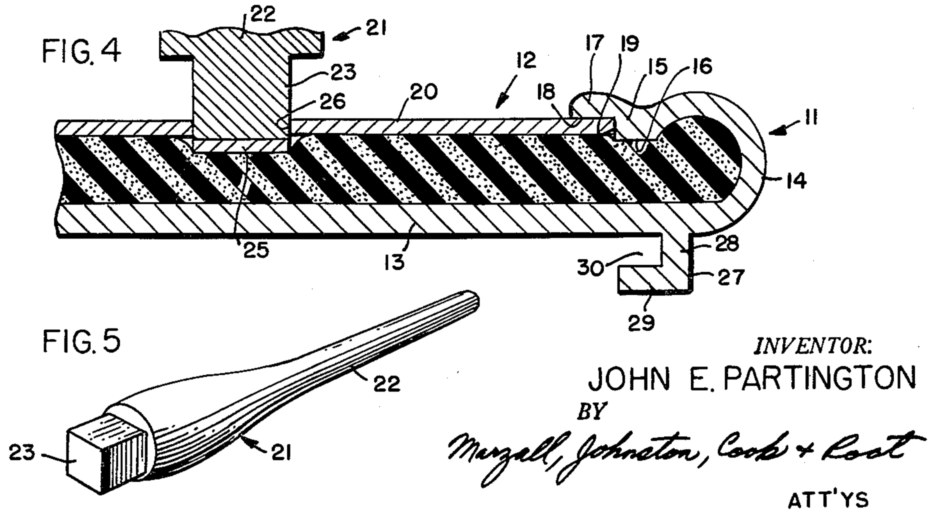
FIG. 4 is an enlarged fragmentary transverse sectional view of one edge of the card holder and illustrating how a piece of material is punched from the card by a stylus.
FIG. 5 is a perspective view of a stylus for use in connection with the present invention.

Extending from the inner end of each bead 15 is a lip or flange 17 having a substantially horizontally extending underlying face 18 coacting with a vertical face 19 to define a shoulder for receiving an edge of a card 20, FIG. 4. The widths of the cards are such that they will fit between the opposed faces 19, whereby the lips 17 hold down the edges of the card and maintain the card in position over the resilient material 12. A card may be inserted in position in the card holder by buckling it along its longitudinal axis and allowing its opposed edges to slip under the opposed lips 17, or by sliding it in the holder from either end thereof. In either case, the resilient material 12 tends to push up on the under surface of the card and hold it against the lips 17.

The resilient or absorbent material 12 may be of any desirable type of material, such as corrugated cardboard, or sponge-like material. Cellulose sponge has been found to work very well.

A stylus 21, FIG. 5, may be provided with the card holder for punching the card 20, wherein, the stylus includes a handle 22 and a hole punching head 23. Depending upon the type of holes to be punched in the card, the cross-section of the hole punching head 23 will vary. But in this case, it is rectangular for punching rectangular holes in the card. Referring to FIG. 1, the card is provided with several rectangularly shaped score lines 24 of the same size as the stylus head 23, whereby punching of the stylus head at one of these score lines will punch a portion 25, FIG. 4, from the card, the portion having been weakened in its attachment to the card by the score lines 24. The punched portion 25 is more or less absorbed by the resilient material 12 thereby defining an opening or hole 26 in the card. Since the resilient or absorbent material 12 effectively absorbs or traps the punched portions 25 between the card and the material, they will not be allowed to fall out of the card holder and be strewn on the floor. Thus the card holder of the present invention serves to retain the punched portion until it is desirous to remove the card and then remove the punched portions from the resilient material 12.

At the side of the backing plate 13 opposite the resilient material 12, a pair of card retaining bars 27 are mounted which include a leg 28 extending outwardly from the backing plate 13 and perpendicular thereto, and a leg 29 exteding from the free end of the leg 28 and substantially parallel to the backing plate 13. The legs 28 and 29 of the card retaining bars define channels 30 for receiving opposed edges of cards, whereby a quantity of cards may be stored on the back of the frame 11.

It will be understood that modifications and variations may be effected without departing from the scope of the novel concepts of the present invention, but it is understood that this application is to be limited only by the scope of the appended claims.

I claim:

1. In combination, a data processing card having a plurality of weakened portions that may be selectively punched out, a card holder including an elongated backing plate, a sheet of cellulose sponge overlying said backing plate and capable of catching and holding the punched out portions, reversely bent flanges at opposite sides of said plate for securing said sheet of sponge to said backing plate, and parallel opposed and inwardly extending flanges projecting from the edges of said reversely bent flanges defining facing open-ended channels for freely receiving said card in overlying relation to said sheet of sponge, and a stylus for punching the weakened portions from the card.

2. The combination as defined in claim 1, and said stylus having a handle and a hole punching head sized substantially equal to a weakened portion.

References Cited in the file of this patent

UNITED STATES PATENTS

| | | |
|---|---|---|
| 223,676 | Kelly | Jan. 20, 1880 |
| 860,089 | Hawkins | July 16, 1907 |
| 1,972,263 | Hansen | Sept. 4, 1934 |
| 2,172,528 | Auer | Sept. 12, 1939 |
| 2,764,239 | Selby | Sept. 25, 1956 |
| 2,770,898 | Lutz et al. | Nov. 20, 1956 |
| 2,923,452 | Holovka | Feb. 2, 1960 |